(12) United States Patent
Haartsen

(10) Patent No.: US 11,469,792 B2
(45) Date of Patent: *Oct. 11, 2022

(54) LONG-RANGE FREQUENCY HOPPING SPECTRUM

(71) Applicant: Plantronics, Inc., Santa Cruz, CA (US)

(72) Inventor: Jacobus Cornelis Haartsen, Rolde (NL)

(73) Assignee: Plantronics, Inc., Santa Cruz, CA (US)

( * ) Notice: Subject to any disclaimer, the term of this patent is extended or adjusted under 35 U.S.C. 154(b) by 77 days.

This patent is subject to a terminal disclaimer.

(21) Appl. No.: 17/131,322

(22) Filed: Dec. 22, 2020

(65) Prior Publication Data

US 2021/0111753 A1    Apr. 15, 2021

Related U.S. Application Data

(63) Continuation of application No. 16/035,483, filed on Jul. 13, 2018, now Pat. No. 10,924,155.

(51) Int. Cl.
*H04B 1/7143* (2011.01)
*H04B 17/10* (2015.01)
(Continued)

(52) U.S. Cl.
CPC .......... *H04B 1/7143* (2013.01); *H04B 1/715* (2013.01); *H04B 17/102* (2015.01);
(Continued)

(58) Field of Classification Search
CPC .... H04B 1/7143; H04B 1/715; H04B 17/102; H04B 2001/7152; H04B 2201/71323;
(Continued)

(56) References Cited

U.S. PATENT DOCUMENTS 6,563,858 B1 * 5/2003 Fakatselis ......... H04L 25/03057
375/150
6,778,831 B1    8/2004 Sancho et al.
(Continued)

OTHER PUBLICATIONS

PCT International Search Report and Written Opinion of the International Search Authority, issued for International Application No. PCT/US2019/041409 dated Jan. 27, 2020, 11 pages.
(Continued)

*Primary Examiner* — Mounir Moutaouakil
(74) *Attorney, Agent, or Firm* — Chuang Intellectual Property Law; Thomas Chuang

(57) ABSTRACT

Methods and apparatuses for carrier selection are described. In one example, a method of carrier selection for a frequency-hopping wireless communication device includes using a fixed set of available carriers to hop over during communications. The method includes allocating a subset of the available carriers to a long-range carrier class. In one example, the subset of available carriers consists of at least two carrier clusters spaced widely in the frequency spectrum. The method further includes monitoring a transmit power level in the wireless communication device. The method further includes using the long-range carrier class to hop over during communications if the wireless communication device transmit power is greater than a predetermined level.

21 Claims, 10 Drawing Sheets

(51) Int. Cl.
*H04B 1/715* (2011.01)
*H04W 24/08* (2009.01)
*H04W 72/04* (2009.01)

(52) U.S. Cl.
CPC ....... *H04W 24/08* (2013.01); *H04W 72/0453* (2013.01); *H04B 2001/7152* (2013.01)

(58) Field of Classification Search
CPC ......... H04B 2201/71346; H04B 1/713; H04W 24/08; H04W 72/0453; H04W 52/283; H04W 52/367; H04W 52/383; H04W 52/42
See application file for complete search history.

(56) References Cited

U.S. PATENT DOCUMENTS

| | | | |
|---|---|---|---|
| 8,577,318 B2 | 11/2013 | Cahill | |
| 9,136,902 B2 | 9/2015 | Chang et al. | |
| 9,668,070 B2 | 5/2017 | El-Hoiydi | |
| 9,699,741 B1 | 7/2017 | Chu et al. | |
| 10,218,551 B1 | 2/2019 | Sethi et al. | |
| 10,602,528 B2 | 3/2020 | Gan et al. | |
| 2004/0037247 A1 | 2/2004 | Ngo | |
| 2011/0237188 A1 | 9/2011 | Sen | |
| 2014/0064301 A1 | 3/2014 | Rison | |
| 2014/0187237 A1 | 7/2014 | Li et al. | |
| 2015/0264626 A1 | 9/2015 | Perdomo | |
| 2015/0326274 A1 | 11/2015 | Flood | |
| 2016/0094373 A1* | 3/2016 | Ibrahim | H04L 27/2602 375/257 |
| 2016/0142177 A1 | 5/2016 | Chou et al. | |
| 2017/0134889 A1 | 5/2017 | Stroud | |
| 2017/0230810 A1 | 8/2017 | Banerjea | |
| 2017/0245147 A1 | 8/2017 | Liu et al. | |
| 2018/0115445 A1 | 4/2018 | Wilhelmsson et al. | |
| 2018/0234358 A1 | 8/2018 | Jakubov et al. | |

OTHER PUBLICATIONS

Halonen et al. eds., "*GSM, GPRS and EDGE performance: evolution towards 3G/UMTS*," 2004, pp. 196-199, John Wiley & Sons (7 pages).

* cited by examiner

LONG-RANGE FREQUENCY HOPPING SPECTRUM

CROSS-REFERENCE TO RELATED APPLICATIONS

The present application is a continuation application relating to and claiming the benefit of U.S. patent application Ser. No. 16/035,483, titled "Long-Range Frequency Hopping Spectrum," having a filing date of Jul. 13, 2018. The content of the aforesaid application is incorporated herein by reference in its entirety.

BACKGROUND OF THE INVENTION

In enterprise applications, achievable user density in wireless voice communications is an important figure of merit for systems using Bluetooth Classic, Bluetooth derivatives such as Bluetooth Low Energy (BLE), and other similar frequency hopping packet-based radio systems. One factor adversely impacting achievable user density is interference. For example, since the first release of the standard in 1999, the Bluetooth wireless technology has seen a major uptake for use in short-range communications. Making use of unlicensed spectrum in the 2.4 GHz ISM band, Bluetooth must share the spectrum with other users, including other Bluetooth users. Being an ad-hoc system, Bluetooth does not coordinate its communication with other systems. Instead, it relies on its frequency hopping capability and retransmissions to deal with interference.

In a typical enterprise usage scenario, numerous base devices (also referred to herein as base stations) are located within a building space. To each base device, a single headset is connected, together forming an independent piconet. The headsets are scattered around the base devices. A frequent topic of discussion is the density of users that can be achieved without noticeable interference, with higher user density naturally being the goal. In Bluetooth, voice is compressed and sent in a series of short packets to the receiver. A packet may be interfered by packets from other Bluetooth transmitters, or by signals from other transmitters in the ISM band.

The quality of the connection is determined by the Bit-Error-Rate (BER) or Packet-Error-Rate (PER) experienced at the wireless receiver, which in turn are functions of the Signal-to-Interference-plus-Noise ratio SINR:

$$SINR = \frac{S}{I+N} \quad (1)$$

A use scenario is called interference-limited when the I in the denominator of equation (1) is the dominating term; a use scenario is called noise-limited when the N in the denominator of equation 1 is the dominating term.

Scenarios where user density is an issue are interference-limited rather than noise-limited. In an interference-limited scenario, the available SINR experienced at the receiver is dominated by the accumulated interference produced by the other users sharing the same area. Since S is the power level of desired signal received, at first glance the solution would seem to be to increase the SINR by increasing the transmit power level of the intended transmitter. However, if all transmitters would thus increase their transmit power levels, the I level would increase proportionally, leaving the SI(N)R ratio unchanged. Power control, therefore, is not effective in interference-limited scenarios.

In a noise-limited situation, only the internal noise N created in the receiver is of importance. In this case, the receive S(I)NR can benefit from increasing the transmit power level as the S is then increased but not the N.

In a dense environment, like a call-center or office environment, most of the users are close to their desks where the base devices reside which connect wirelessly to their headsets. These users are in an interference-limited situation. For these users, both the base station and headset use a low transmit power level to save power and to create as little interference to other users in the band. Yet, occasionally, a user may get up, leave his desk, and walk a distance away. This user moves from an interference-limited situation to a noise-limited situation.

In the prior art, some wireless systems, like Bluetooth, apply adaptive power control where the receiver requests the transmitter to increase or decrease its transmit power level in order to keep the S(I)NR experienced at the receiver at a sufficient level for acceptable PER in a noise-limited situation. Since the power level of this noise-limited "rogue" user is increased whereas the transmit power levels of the other users in their interference-limited situation does not change, the SI(N)R of the other users is affected negatively, impacting the overall density. In the prior art, all users in a frequency-hopping system are treated equally and no special actions are taken for users that walk away from their desks.

As use of frequency hopping packet-based radio systems continues to increase, improved technologies, methods, and apparatuses for such systems are needed.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Figure 1:
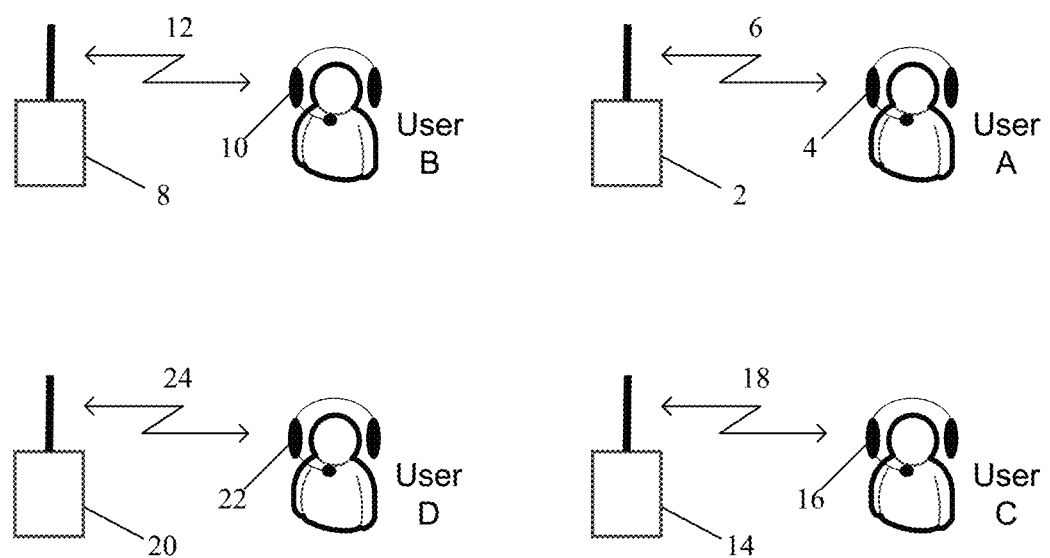
FIG. 1 illustrates a frequency-hopping radio communication system with multiple base devices and client devices.

Methods and apparatuses for frequency hopping carrier selection are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein.

Block diagrams of example systems are illustrated and described for purposes of explanation. The functionality that is described as being performed by a single system component may be performed by multiple components. Similarly, a single component may be configured to perform functionality that is described as being performed by multiple components. For purpose of clarity, details relating to technical material that is known in the technical fields related to the invention have not been described in detail so as not to unnecessarily obscure the present invention. It is to be understood that various examples of the invention, although different, are not necessarily mutually exclusive. Thus, a particular feature, characteristic, or structure described in one example embodiment may be included within other embodiments unless otherwise noted.

In one example embodiment, a method of carrier selection for a frequency-hopping wireless communication device includes using a fixed set of available carriers to hop over during communications. The method includes allocating a subset of the available carriers to a long-range carrier class. In one example, the subset of available carriers consists of at least two carrier clusters spaced widely in the frequency spectrum. In one example, the number of carriers in the long-range carrier class depends on the number of long range users. The method further includes monitoring a transmit power level in the wireless communication device. The method further includes using the long-range carrier class to hop over during communications if the wireless communication device transmit power is greater than predetermined level.

In one example, a method of carrier selection for wireless communications between a first communications device and a second communications device in a frequency hopping communications system includes allocating to a long range carrier class a long range subset of carriers within a defined frequency-hopping spectrum between the first communications device and the second communications device. The method includes allocating to a short range carrier class a short range subset of carriers within the defined frequency-hopping spectrum between the first communications device and the second communications device. The method further includes monitoring a transmit power level between the first communications device and the second communications device, and identifying a high transmit power level condition comprising determining whether the transmit power level exceeds a threshold value. The method further includes transmitting data between the first communications device and the second communications device comprising frequency hopping between carriers only within the long range subset of carriers responsive to identifying the high transmit power level condition.

In one example, a communications device for wireless communications includes a processor, a wireless transceiver configured for wireless communications utilizing a defined frequency-hopping spectrum, an antenna, and a memory storing a carrier selection optimization application program. The carrier selection optimization application program is configured to allocate to a long range carrier class a long range subset of carriers within a defined frequency-hopping spectrum between the communications device and a second communications device. The carrier selection optimization application program is configured to allocate to a short range carrier class a short range subset of carriers within the defined frequency-hopping spectrum between the communications device and the second communications device. The carrier selection optimization application program is further configured to monitor a transmit power level between the communications device and the second communications device, and identify a high transmit power level condition comprising determining whether the transmit power level exceeds a threshold value. The carrier selection optimization application program is further configured to transmit utilizing the wireless transceiver data between the communications device and the second communications device comprising frequency hopping between carriers only within the long range subset of carriers responsive to identifying the high transmit power level condition.

In one example, a system includes a central controller device and a first communications device. The central controller device includes a central controller processor, a central controller wireless transceiver, a central controller antenna, and a central controller memory storing a frequency hopping spectrum management application program. The frequency hopping spectrum management application program is configured to allocate to a long range carrier class a long range subset of carriers within a defined frequency-hopping spectrum and allocate to a short range carrier class a short range subset of carriers within the defined frequency-hopping spectrum. The frequency hopping spectrum management application program is configured to monitor an activity level within the long range subset of carriers, and dynamically adjust a size of the long range subset of carriers responsive to the activity level within the long range subset of carriers.

The first communications device includes a first communications device processor, a first communications device wireless transceiver configured for wireless communications with the central controller device and a second communications device, and a first communications device antenna. The first communications device further includes a first communications device memory storing a carrier selection optimization application. The carrier selection optimization application is configured to receive from the central controller device an identification of the long range subset of carriers and the short range subset of carriers. The carrier selection optimization application is further configured to monitor a transmit power level between the first communications device and the second communications device, and identify a high transmit power level condition comprising determining whether the transmit power level exceeds a threshold value. The carrier selection optimization application is further configured to transmit data between the first communications device and the second communications device comprising frequency hopping between carriers only within the long range subset of carriers responsive to identifying the high transmit power level condition.

Advantageously, the methods and systems described provide improved density in Enterprise scenarios where there is a mix of users located at their desks and users walking around. Moreover, it takes care of frequency-selective fading that may give erroneous conclusions in distance measurements based on received signal strength indication (RSSI).

FIG. 1 illustrates a frequency-hopping radio communication system with multiple base devices and client devices. The frequency-hopping radio communication system may, for example, be implemented in a telephone call center or an office environment having a high density of users. A base device 2 from the plurality of base devices is configured to establish a wireless communications link 6 (e.g., a wireless link) with a client device 4 (e.g., a wireless headset or other user wearable mobile device) used by User A. Base device 2 transmits data communications packets to and receives data communications packets from the client device 4 at User A over the wireless communications link 6. In one example, the frequency-hopping radio communication system is a Bluetooth system, where the base device 2 is a Bluetooth base station and the client device 4 is a Bluetooth headset. The wireless communications link 6 is a Bluetooth protocol connection.

A second base device 8 from the plurality of base devices is configured to establish a second wireless communications link 12 with a second client device 10 used by a User B. The second base device 8 transmits data communications packets to and receives data communications packets from the second client device 10 over the second wireless communications link 12. Base device 14 and client device 16 utilized by User C operate in a similar manner utilizing wireless communications link 18. Base device 20 and client device 22 utilized by User D operate in a similar manner utilizing wireless communications link 24.

A carrier frequency in a frequency band is used by a base station in radio contact with a client device. For example, a base device 2 transmits to a client device 4 in a transmit time slot in a first frame on a selected carrier frequency. The client device 4 transmits to the base device 2 in a receive time slot in a second frame on the same or different selected carrier frequency. Thus, during transmit time slots, base device 2 acts as a transmitter and during receive time slots base device 2 operates as a receiver. The first frame and the second frame taken together form a duplex frame.

The illustrated devices (e.g., Bluetooth devices) apply Adaptive Frequency Hopping (AFH). The adaptiveness comes from the fact that the master can decide to use (i.e., hop over) only a subset of carriers out of all carriers available. It is up to the manufacturers how to decide on the subset. The Bluetooth standard includes several commands at the Link Manager Protocol (LMP) level to enable AFH. Most important is the command LMP_set_AFH which includes an AFH_Channel_Map representing a bit map of the carriers that are used and unused. In one example of the methods and apparatuses described herein, this bit map may be used to point to the carriers the long-range users should use.

Normally, a master of the link receives information on the quality of the carriers and then determines the set of carriers to hop over (i.e. a set with the least interfered carriers). However, the Bluetooth standard also allows a set to be created based on "local information", i.e. a set definitions that comes from somewhere else. This means that by software/firmware changes, the inventive methods and apparatuses described herein are implemented. In one example, the "local information" is downloaded in the device at manufacturing or when a device firmware or software update or upgrade (DFU) is carried out. In another example described below, the "local information" comes from the central controller, defining the set of carriers for the long-range users. The master on the link identifies that it is a long-range (high-power) user, and then contacts the central controller for this local information.

Base devices 2, 8, 14, and 20 may, for example, be a landline phone, access point (AP), personal computer, USB dongle, or mobile phone. Base devices 2, 8, 14, and 20 are coupled to a telecommunications network. The network may be a communications network which may include a public switched telephone network (PSTN), a cellular network, an integrated services digital network (ISDN), a local area network (LAN), and/or a wireless local area network (WLAN), that support standards such as Ethernet, 802.11, and/or voice over internet protocol (VoIP).

Base devices 2, 8, 14, and 20 include a transceiver and a processor configured to allow a wireless device (e.g., one of the client devices 4, 10, 16, and 22) access to a network connected to the base station (e.g., via a 10/100 Ethernet RJ-45 port). For example, the base station may be any device that allows wireless-equipped computers and other devices to communicate with a wired network. In one example, the base stations are able to support the 802.11a, 802.11b, and/or 802.11g wireless networking standards. In other examples, the base stations may be able to support other wireless networking standards.

The transmit power of base stations and/or client devices over wireless links 6, 12, 18 and 24 is measured and monitored over time and processed to determine whether to perform communications (i.e., frequency hop) over a long range subset of carriers or a short range subset of carriers. The transmit power measurements can be monitored either at the client device or at the base device, or both. If measured and monitored at the base device, the client device can be configured to query the base device as to the transmit power. If measured and monitored at the client device, the base device can be configured to query the client device as to the transmit power. In one example, the transmit power measurements are processed at the client device to determine the appropriate subset of carriers. In a further example, the transmit power measurements are processed at the base device to determine the appropriate subset of carriers.

Figure 2:
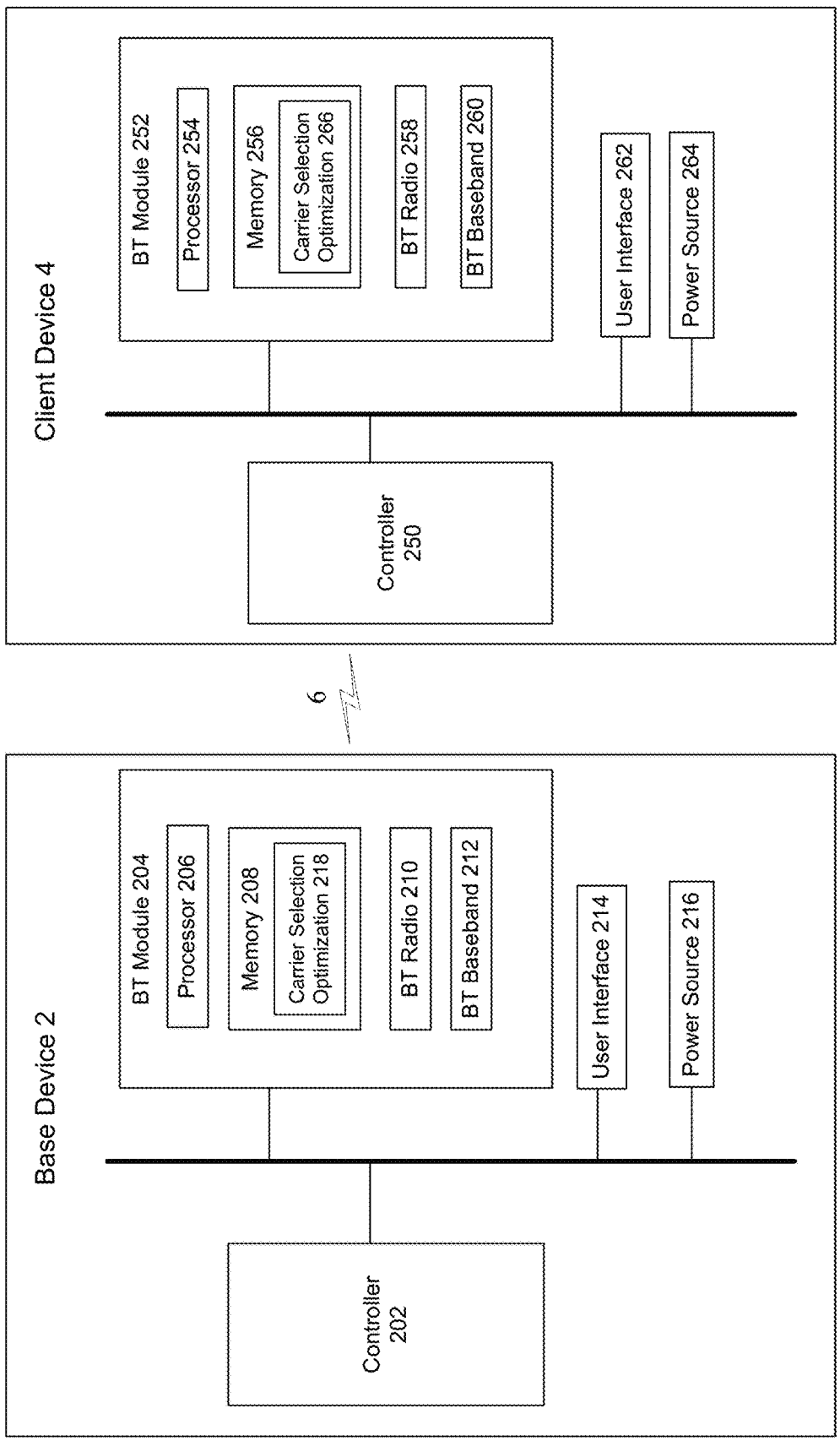
FIG. 2 illustrates simplified block diagrams of the base device and the client device shown in FIG. 1 in one example.

FIG. 2 illustrates simplified block diagrams of the base device 2 and the client device 4 shown in FIG. 1 in one example. In a Bluetooth implementation, a base device 2 includes a controller 202, Bluetooth module 204, user interface 214, and power source 216. For example, base device 2 may be a mobile phone, headset, PDA, smartphone, portable computer, or other electronic device.

Bluetooth module 204 includes a processor 206, Bluetooth radio 210, and Bluetooth baseband 212. Bluetooth module 204 also includes a memory 208 storing a carrier selection optimization application program 218. Processor 206 executes the programs stored in memory 208. Bluetooth radio 210 includes an antenna port (not shown), and may be implemented on a separate chip. Bluetooth radio 210 may include a Bluetooth compatible transmitter modulator and a Bluetooth compatible receiver modulator. Bluetooth radio 210 is configured to transmit or receive voice or data packets via an antenna.

Processor 206 may include a variety of processors (e.g., digital signal processors), with conventional CPUs being applicable. Memory 208 may include a variety of memories, and in one example includes RAM, ROM, flash memory, or a combination thereof. Memory 208 may further include separate memory structures or a single integrated memory structure. One or more components of Bluetooth module 204 may be integrated with components at base device 2.

In one example operation, carrier selection optimization application program 218 allocates to a long range carrier class a long range subset of carriers within a defined frequency-hopping spectrum between the base device 2 and a client device 4. In one example embodiment, the long range subset of carriers is distributed within two or more sub-bands of the defined frequency-hopping spectrum. Each sub-band of the two or more sub-bands includes two or more adjacent (e.g., consecutive) carriers, and each sub-band is separated from any other sub-band by two or more carriers. In one example, the two or more sub-bands include a first sub-band located in a lower one-third of the defined frequency-hopping spectrum, a second sub-band located in a middle one-third of the defined frequency-hopping spectrum, and a third sub-band located in a higher one-third of the defined frequency-hopping spectrum. Distribution of the long range subset of carriers within two or more sub-bands in one example is described below in reference to FIG. 4.

In a further example embodiment, the long range subset of carriers is distributed throughout the defined frequency-hopping spectrum. Distribution of the long range subset of carriers throughout the defined frequency-hopping spectrum in one example is described below in reference to FIG. 6.

In one example, carrier selection optimization application program 218 monitors an activity level within the long range subset of carriers and dynamically adjust a size of the long range subset of carriers responsive to the activity level. For example, the activity level is the number of long-range users and their data traffic intensity.

Carrier selection optimization application program 218 allocates to a short range carrier class a short range subset of carriers within the defined frequency-hopping spectrum between the base device 2 and the client device 4. In one example, carriers within the frequency-hopping spectrum not allocated to the long ranger carrier class are automatically allocated to (i.e., utilized as) the short range carrier class.

Figure 3:
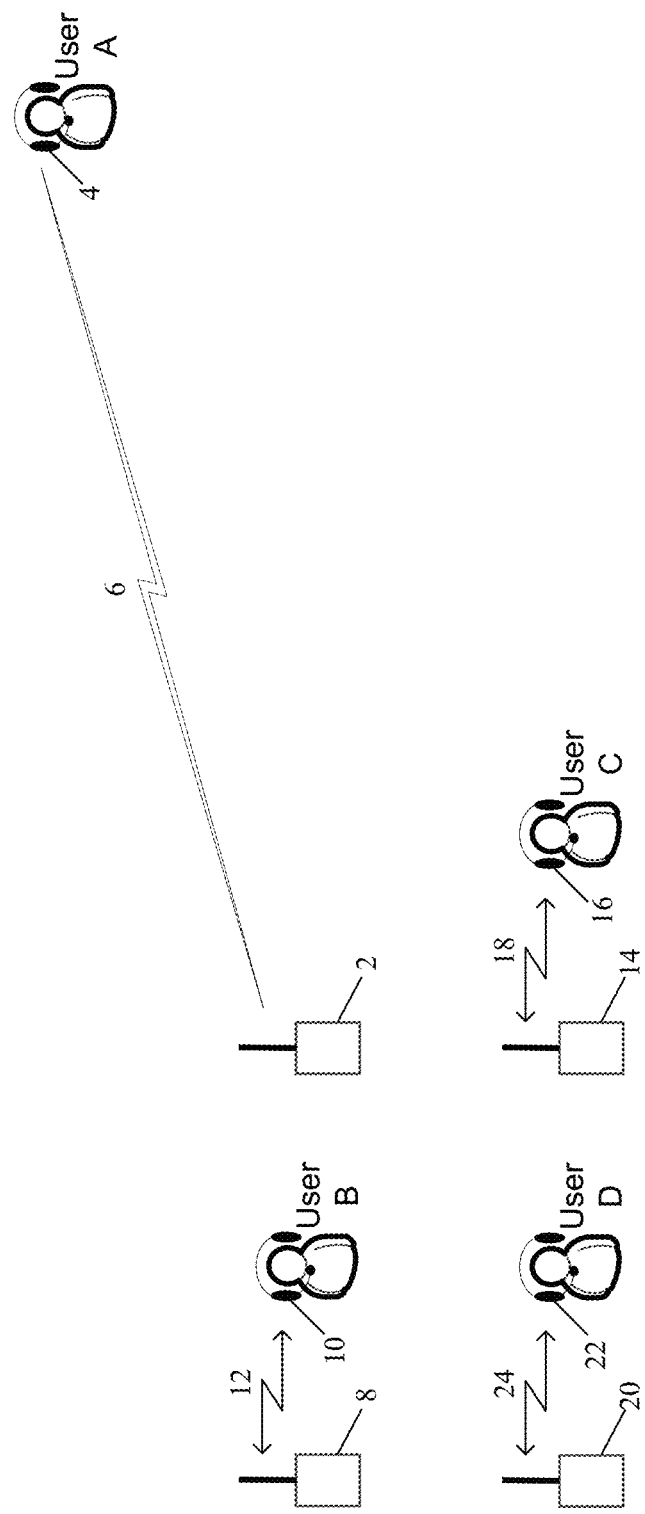
FIG. 3 illustrates a usage scenario for optimized carrier selection where there is one high-transmit power user and several low-transmit power users.

Carrier selection optimization application program 218 monitors a transmit power level between the base device 2 and the client device 4, and identifies a high transmit power level condition by determining whether the transmit power level exceeds a threshold value. In one example, carrier selection optimization application program 218 monitors the transmit power from base device 2 to client device 4. In one example, carrier selection optimization application program 218 monitors the transmit power from client device 4 to base device 2. Carrier selection optimization application program 218 transmits utilizing the wireless transceiver a data between the base device 2 and the client device 4 by frequency hopping between carriers only within the long range subset of carriers responsive to identifying the high transmit power level condition. FIG. 3 illustrates a usage scenario for optimized carrier selection where there is one high-transmit power user (e.g., User A) and several low-transmit power users (e.g., Users B, C, and D). In the scenario illustrated in FIG. 3, base device 2 and client device 4 are in a high transmit power condition and are therefore operated by frequency hopping between carriers only within the long range subset of carriers.

If User A returns close to base device 2, carrier selection optimization application program 218 identifies a transition from the high transmit power level condition to a low transmit power condition. Responsive to identifying the transition, it switches from frequency hopping between carriers only within the long range subset of carriers to frequency hopping between carriers only within the short range subset of carriers.

Bluetooth client device 4 includes a controller 250, Bluetooth module 252, user interface 262, and power source 264. Bluetooth module 252 includes a processor 254, Bluetooth radio 258, and Bluetooth baseband 260. Bluetooth module 252 also includes a memory 256 storing a carrier selection optimization application program 266. Processor 254 executes programs stored in memory 256. Bluetooth radio 258 includes components and operates similar to Bluetooth radio 210 described above. For example, client device 4 may be a mobile phone, headset, PDA, smartphone, portable computer, or other electronic device. Carrier selection optimization application program 266 is capable of performing all of the functions performed by carrier selection application program 218 described above. For example, when client device 4 is the Bluetooth master device and base device 2 is the Bluetooth slave device, carrier selection optimization application program 266 performs the functions as described above performed by carrier selection application program 218.

Figure 4:
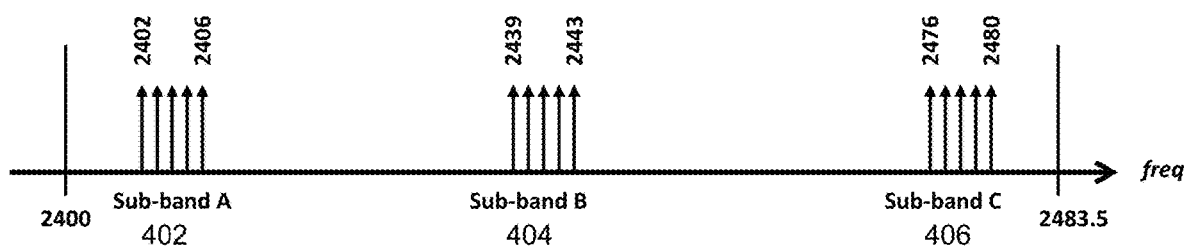
FIG. 4 illustrates allocation of carriers to a long range subset of carriers in one example.

FIG. 4 illustrates allocation of carriers to a long range subset of carriers in one example. As described, in order to reduce the impact of rogue users on the normal users, carriers in the frequency-hopping (FH) spectrum are reserved specifically for long-range users. Currently, Bluetooth Classic uses 79 carriers to hop over. According to the FCC part 15 rules, the minimum number of carriers to hop over for a FH system is 15. In one example, long-range users are restricted to use 15 dedicated carriers only. Preferably, these carriers are spread out over the entire 80 MHz of the 2.4 GHz ISM band. For example, in the ISM band, three sub-bands A 402, B 404, and C 406, each containing five carriers are placed according to the structure in FIG. 4. The ISM band ranges from 2400 MHz until 2483.5 MHz. For Bluetooth Classic, 79 carriers spaced at 1 MHz are defined starting at 2402 MHz and ending at 2480 MHz.

Figure 5:
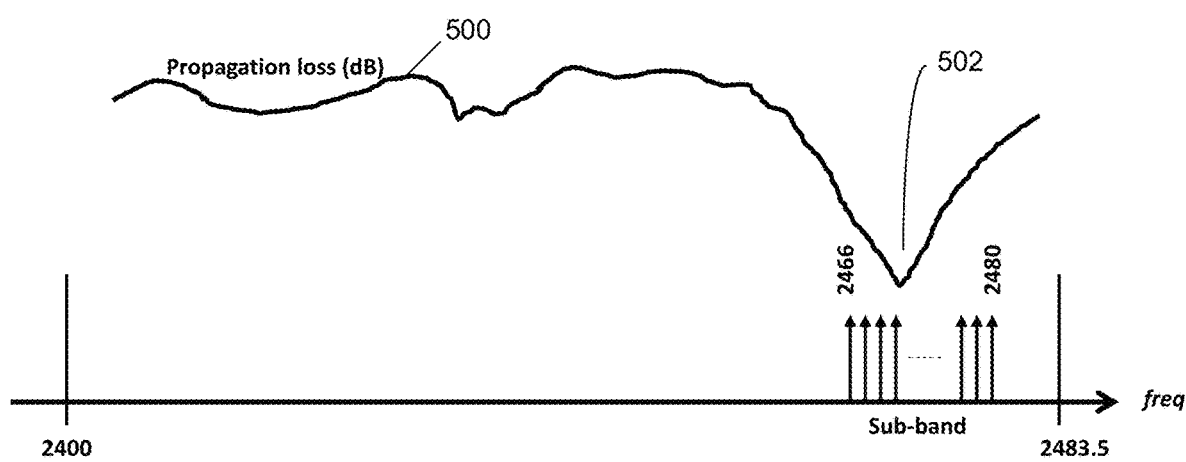
FIG. 5 illustrates frequency-selective propagation loss.

For long-range usage, three sub-bands A 402, B 404, and C 406 are defined at the lower, the middle, and the higher part of the 2.4 GHz spectrum. The reason for this spreading is frequency-selective fading. Due to reflections from walls, floor and ceiling, the propagation loss from transmitter to receiver varies over frequency. The propagation loss over frequency in an indoor environment may look like the curve 500 in FIG. 5. Here, a deep notch 502 is observed in the upper part of the spectrum where different radio signals add destructively and cancel each other. If a long-range receiver would experience such a propagation loss and would only use the upper part of the spectrum, its communications would be severely hampered be the additional loss caused by the propagation notch. Even higher transmit power would be needed to overcome the loss. By spreading the carriers as illustrated in FIG. 4, only the upper sub-band would cause extra propagation losses whereas communications in the other sub-bands is not hindered, i.e. frequency diversity is obtained. In the same manner, protection is also obtained against other systems using the band, e.g. WLAN IEEE 802.11 systems which typically occupy a 20 MHz band in the lower, middle, or upper part of the 2.4 GHz ISM band.

Figure 6:
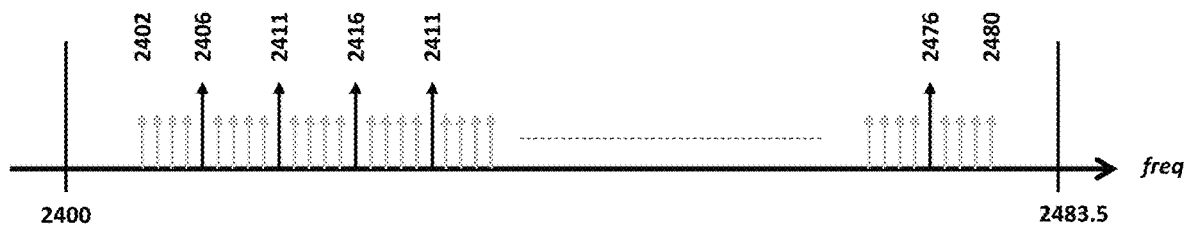
FIG. 6 illustrates allocation of carriers to a long range subset of carriers in a further example.

As an alternative to the spreading in the spectrum using three sub-bands as shown in FIG. 4, fifteen dedicated carriers evenly spread over the 80 MHz may be used. For example, counting from carrier 0 at 2402 MHz until carrier 78 at 2480 MHz, we could reserve every $5^{th}$ carrier for the long-range users (carrier 2406, 2411, . . . 2476 MHz), as illustrated in FIG. 6.

Though advantageous over the prior art, this structure is less attractive than the sub-band structure presented in FIG. 4. This is because there will be more impact on the adjacent channels in the receivers of the low-range users. A receiver is not only hit by the interference on the carrier it is tuned to, but also by interference on nearby (adjacent) channels. The impact on the first adjacent (directly next to the tuned carrier) is the biggest, and the impact reduces as the adjacent channel is further separated from the tuned carrier. In the band structure of FIG. 4, adjacent channel issues in low-range receivers only occur when the tuned carrier is close to the sub-band edges (i.e. close to long-range carriers 2406, 2439, 2443, and 2476 MHz). In the structure of FIG. 6, adjacent channel issues occur almost at every low-range carrier.

In one example, if a client device 4 (e.g., a headset) finds that the average RSSI (averaged over all 79 carriers or a subset determined by the Adaptive Frequency Hopping, AFH mechanism acting to avoid interferers like WiFi access points) is too low for an acceptable receive power level, it shall instruct the base device 2 to increase its transmit power level (using LM messages). The base device 2 will monitor the transmit power level it is using. If its transmit power exceeds a certain threshold, the base device 2 will move from the low-range mode to the long-range mode. It will subsequently only hop over the carriers located in the dedicated, long-range sub-bands A, B, and C. As long as its transmit power level remains above a certain threshold, the base device 2 shall stay in the long-range mode. When its transmit power has reached a certain (low) threshold, it may be concluded that the user is close to his desk again, and therefore will use all 79 carriers, moving back from the long-range mode to the low-range mode.

Devices residing in the low-range mode will not apply power control. They may want to avoid sub-bands A 402, B 404, and C 406 altogether, thus avoiding the long-range users. However, since sub-bands A 402, B 404, and C 406 together represent about 20% of the available Bluetooth spectrum, it is a waste of avoiding these carriers if no long-range users are present. Therefore, it is preferred to allow the AFH mechanism built into Bluetooth Classic to identify the busy carriers in sub-bands A 402, B 404, and C 406 dynamically. That is, as more long-range, high-power users are making use of the reserved long-range sub-bands, other users will detect additional interference on these carriers and avoid them (in a similar fashion as carriers used by WiFi are avoided).

Figure 7:
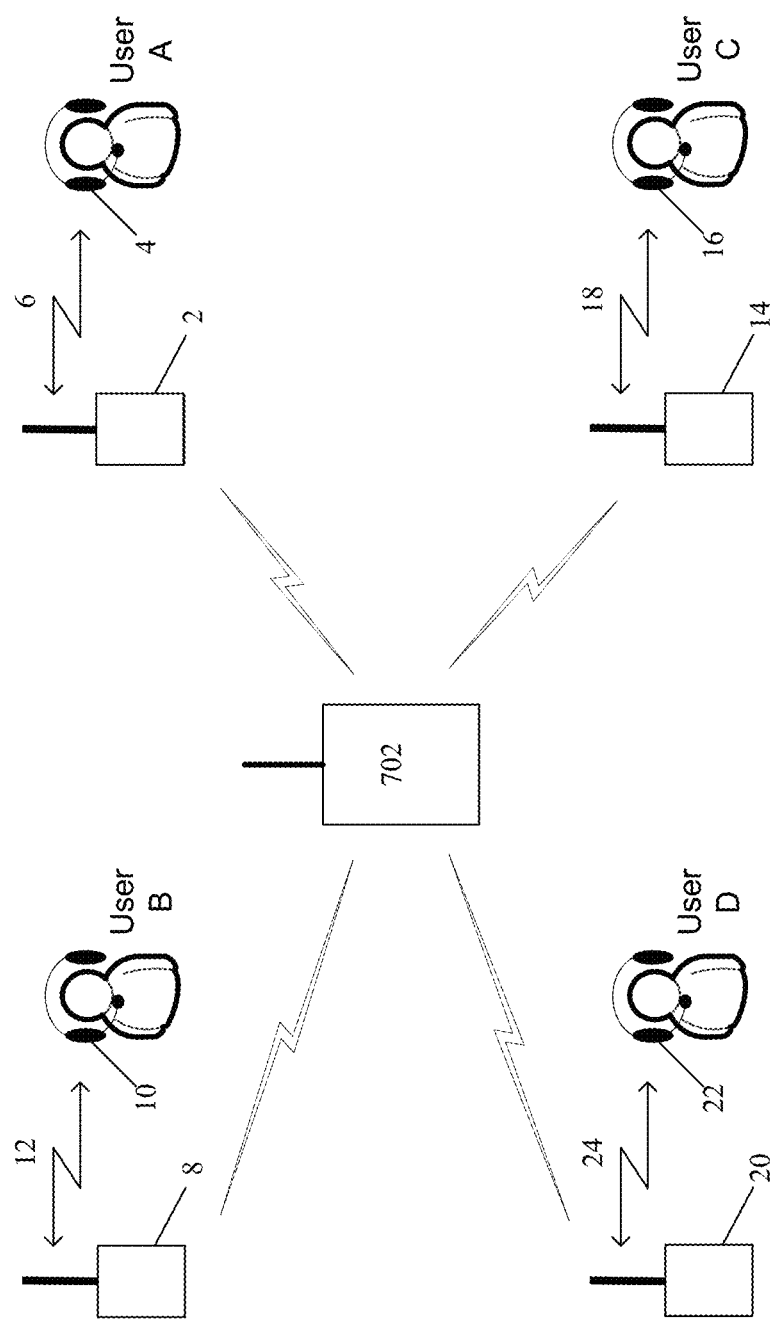
FIG. 7 illustrates a frequency-hopping radio communication system with a central controller device, multiple base devices, and multiple client devices.

In a further example, FIG. 7 illustrates a frequency-hopping radio communication system with a central controller device 702, multiple base devices 2, 8, 14, and 20, and multiple client devices 4, 10, 16, and 22. Central controller device 702 is capable of wireless communications with multiple base devices 2, 8, 14, and 20 and multiple client devices 4, 10, 16, and 22. The base devices and client devices are substantially similar to base device 2 and client device 4 described above with functionality modified as described herein by the presence of central controller device 702.

Figure 8:
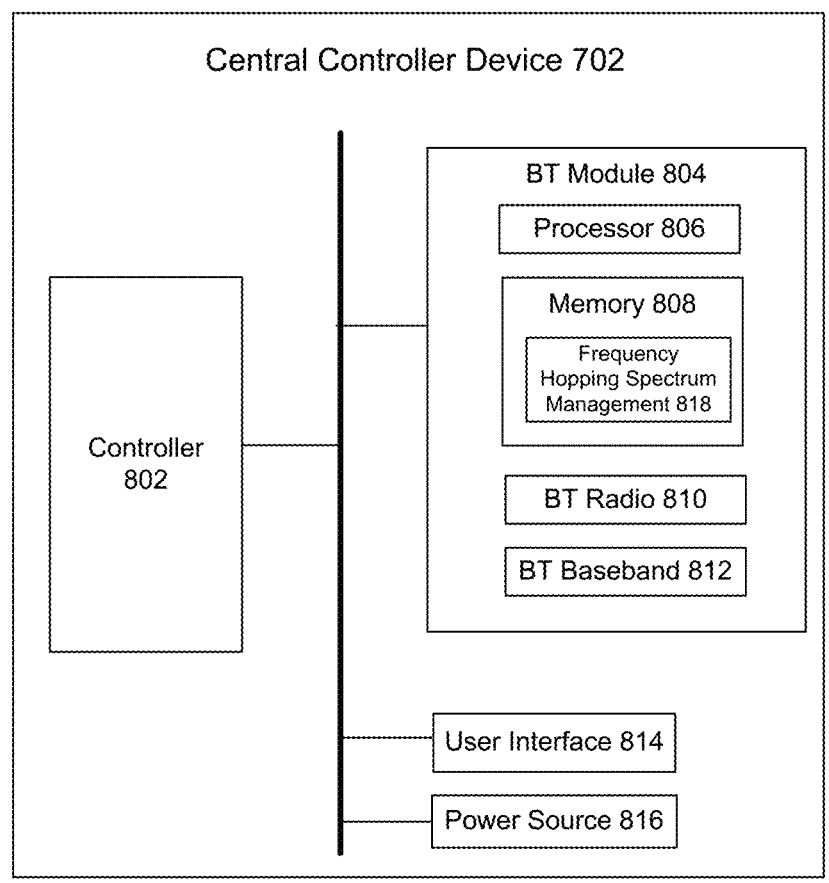
FIG. 8 illustrates a simplified block diagram of the central controller device shown in FIG. 7 in one example.

FIG. 8 illustrates a simplified block diagram of the central controller device 702 shown in FIG. 7 in one example. In a Bluetooth implementation, central controller device 702 includes a controller 802, Bluetooth module 804, user interface 814, and power source 816. For example, central controller device 702 may be a server, personal computer, or other electronic device.

Bluetooth module 804 includes a processor 806, Bluetooth radio 810, and Bluetooth baseband 812. Bluetooth module 804 also includes a memory 808. Processor 806 executes programs stored in memory 808, including frequency hopping spectrum management application program 818. Bluetooth radio 810 includes an antenna port (not shown), and may be implemented on a separate chip. Bluetooth radio 810 may include a Bluetooth compatible transmitter modulator and a Bluetooth compatible receiver modulator. Bluetooth radio 810 may support the Bluetooth Classic standard or the Bluetooth Low Energy standard, or both. Bluetooth radio 810 is configured to transmit or receive voice or data packets via an antenna.

Processor 806 may include a variety of processors (e.g., digital signal processors), with conventional CPUs being applicable. Memory 808 may include a variety of memories, and in one example includes RAM, ROM, flash memory, or a combination thereof. Memory 808 may further include separate memory structures or a single integrated memory structure. One or more components of Bluetooth module 804 may be integrated with components at Bluetooth central controller device 702.

The frequency hopping spectrum management application program 818 is configured to allocate to a long range carrier class a long range subset of carriers within a defined frequency-hopping spectrum and allocate to a short range carrier class a short range subset of carriers within the defined frequency-hopping spectrum.

In one example, the long range subset of carriers are distributed within two or more sub-bands of the defined frequency-hopping spectrum, wherein each sub-band of the two or more sub-bands include two or more adjacent carriers, and wherein each sub-band is separated from any other sub-band by two or more carriers. For example, the two or more sub-bands include a first sub-band located in a lower one-third of the defined frequency-hopping spectrum, a second sub-band located in a middle one-third of the defined frequency-hopping spectrum, and a third sub-band located in a higher one-third of the defined frequency-hopping spectrum. In a further example, the long range subset of carriers are distributed throughout the defined frequency-hopping spectrum.

The frequency hopping spectrum management application program 818 monitors an activity level within the long range subset of carriers, and dynamically adjusts a size of the long range subset of carriers responsive to the activity level. The activity level monitored by the frequency hopping spectrum management application program 818 may include the traffic intensity on each of the carriers being currently used by long-range users. In one example, the carrier selection optimization application program 218 at the base device 2 transmits to the central controller device 702 a notification indicating that the base device 2 is frequency hopping between carriers only within the long range subset of carriers. The frequency hopping spectrum management application program 818 at the central controller device 702 utilizes the notification to monitor the activity level within the long range subset of carriers.

In this example, carrier selection optimization application program 218 (or alternatively, carrier selection optimization application program 266 at client device 4) is configured to receive from the central controller device 702 an identification of the long range subset of carriers. The carrier selection optimization application program 218 is further configured to monitor a transmit power level between the base device 2 and the client device 4, and identify a high transmit power level condition comprising determining whether the transmit power level exceeds a threshold value. The carrier selection optimization application program 218 is further configured to transmit a data between the base device 2 and the client device 4 comprising frequency hopping between carriers only within the long range subset of carriers responsive to identifying the high transmit power level condition.

In one example, the carrier selection optimization application program 218 is further configured to identify a transition from the high transmit power level condition to a low transmit power condition, and switch from frequency hopping between carriers only within the long range subset of carriers to frequency hopping between carriers only within the short range subset of carriers responsive to identifying the transition. As before, functionality performed by carrier selection optimization application program 218 may also be performed by carrier selection optimization application program 266.

Figure 9:
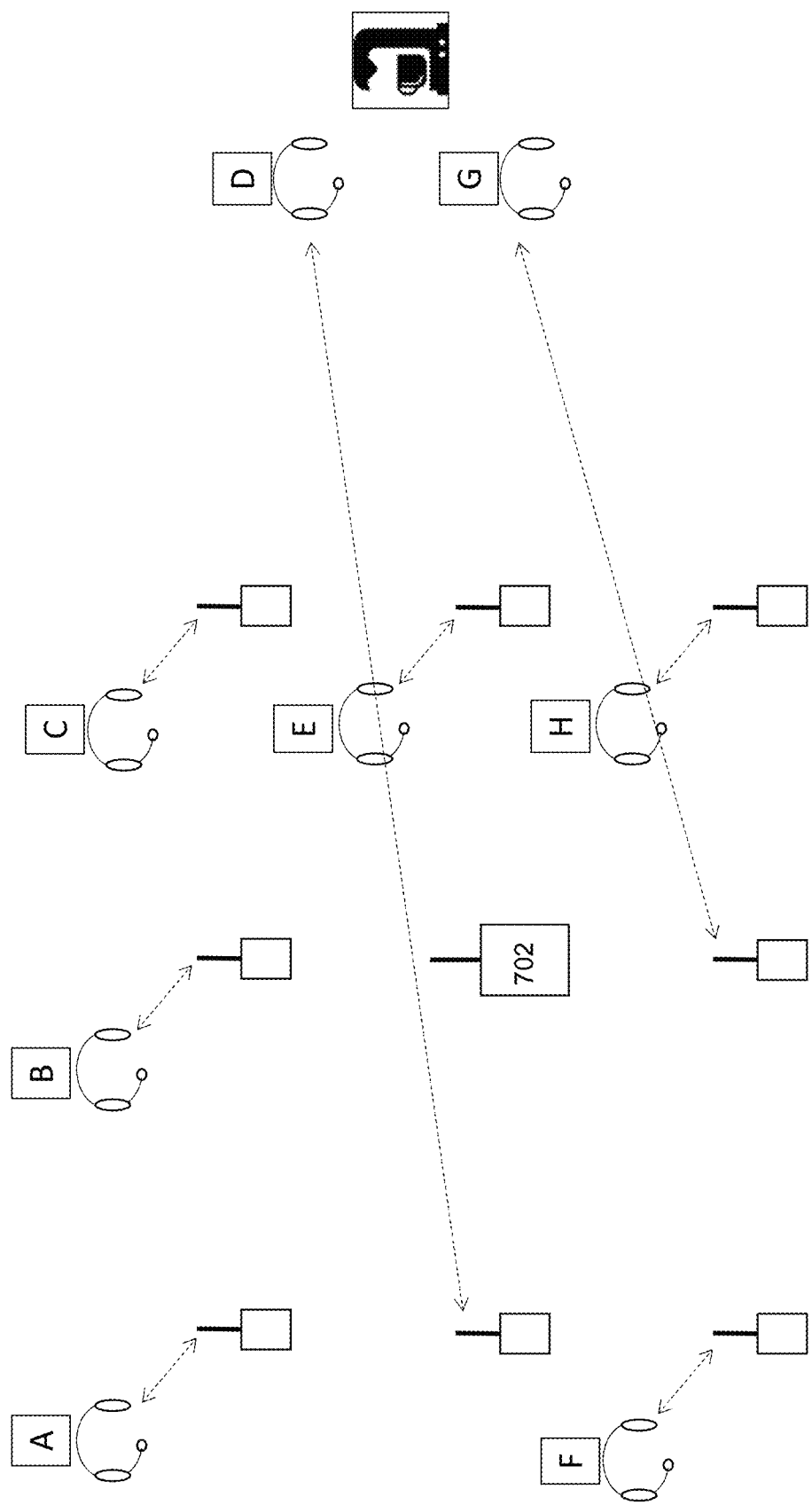
FIG. 9 illustrates a usage scenario for optimized channel selection where there are several high-transmit power users and several low-transmit power users.

FIG. 9 illustrates a usage scenario for optimized channel selection where there are several high-transmit power users and several low-transmit power users. Specifically, FIG. 9 illustrates a scenario with low-range (i.e., short range) users (A, B, C, E, F and H) and long-range users (D and G) (e.g., users who have walked away from their desk to a coffee machine a distance away).

In one example described herein, the long-range users are sharing the 15 carriers set aside for long-range usage (a smaller number of dedicated carriers can be used if spectrum regulations allow). Yet, if more users are moving from the low-range mode to the long-range mode, this set of 15 carriers may be too small, i.e. the performance of the long-range users is affected since not enough spectrum is set aside. In a further embodiment, the number of carriers set aside for long-range usage is dynamic and depends on the number of long-range users. In one example, a central controller device 702 keeps track of the number of users in long-range mode, and can dynamically increase or decrease the spectrum set aside for long-range usage. The architecture is shown in FIG. 9.

The base devices (e.g., similar to base device 2) and/or client devices (e.g., similar to client device 4) may communicate with the central controller device 702. This can be wirelessly, or wired (at least for the base devices). Wireless communications to the central controller device 702 will typically use the dedicated, long-range carriers.

When a device enters the long-range mode, it will contact the central controller device 702 and will indicate it has moved to the long-range mode, using the long-range spectrum. It will receive from the central controller device 702 the subset of carriers that are set aside for long-range usage. While in long-range mode, the device may periodically contact the central controller device 702 for updates of the subset of long-range carriers. As more low-range users move to long-range usage, the central controller device 702 may increase the size of the subset of long-range carriers. In this way, the system breathes with the ratio between low- and long-range users. Devices of low-range users may contact the central controller device 702 to inquire about the subset of long-range carriers to incorporate this knowledge in their AFH decisions. Alternatively, they may rely solely on the measurements they make for the AFH mechanism.

The central controller device 702 utilizes a Bluetooth transceiver based on Bluetooth Classic or (preferably) Bluetooth Low Energy. Using the long-range mode specified in BLE v5.0, the coverage of the central controller device 702 is increased. Since the amount of data exchanged is small, a low duty cycle connection between the central controller device 702 and the devices in range can be supported. Alternatively, a unit only connects to the central controller device 702 on demand, i.e. when it is using a larger TX power to cover a longer range to its base device (it will know that since the adaptive power control kicks in to keep power levels above the noise). It can then register as a long-range user and apply the long-range spectrum. When the TX power has gone down again, it may contact the central controller device 702 again to de-register and return to the ordinary spectrum.

Figure 10:
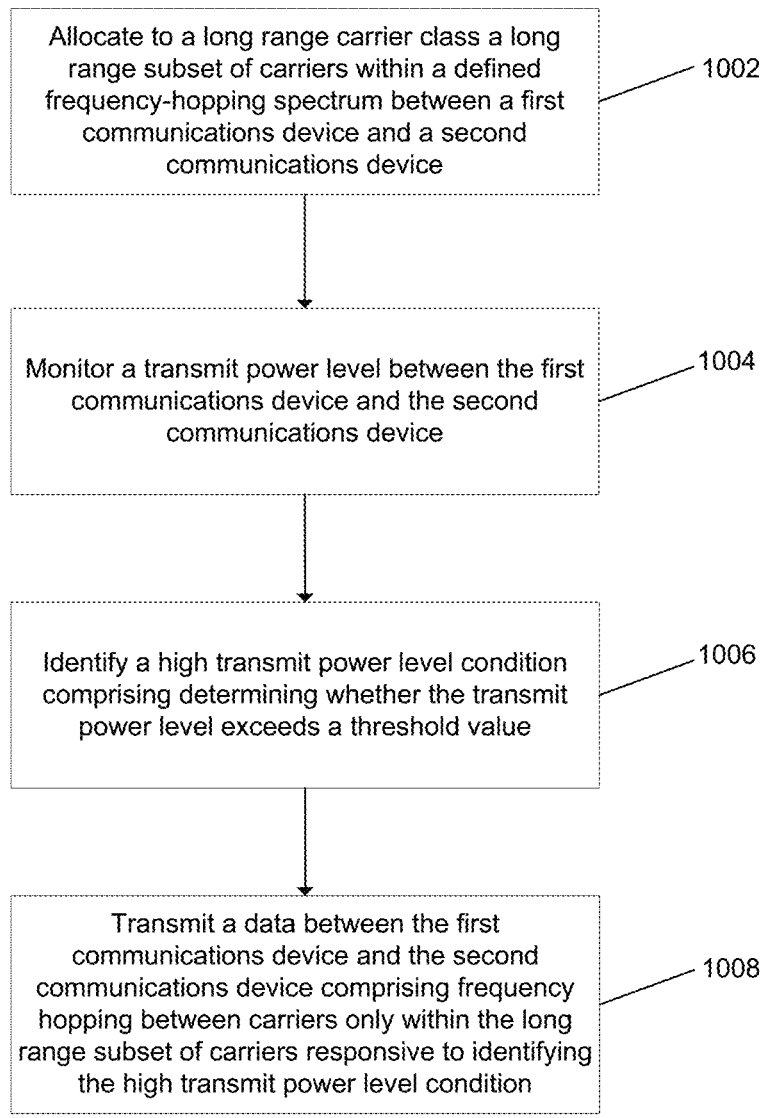
FIG. 10 is a flow diagram illustrating a channel selection process for communications in a frequency hopping communications system between a first device and a second device in one example.

FIG. 10 is a flow diagram illustrating a channel selection process for communications in a frequency hopping communications system between a first device and a second device in one example. In one example, the first communications device includes a Bluetooth base device and the second communications device includes a user wearable Bluetooth mobile device. In a further example, the first communications device includes a user wearable Bluetooth mobile device and the second communications device includes a Bluetooth base device.

At block 1002, a long range subset of carriers within a defined frequency-hopping spectrum between the first communications device and the second communications device are allocated to a long range carrier class. In one example, the long range subset of carriers are distributed within two or more sub-bands of the defined frequency-hopping spectrum, wherein each sub-band of the two or more sub-bands comprise two or more adjacent carriers, and wherein each sub-band is separated from any other sub-band by two or more carriers. For example, the two or more sub-bands include a first sub-band located in a lower one-third of the defined frequency-hopping spectrum, a second sub-band located in a middle one-third of the defined frequency-hopping spectrum, and a third sub-band located in a higher one-third of the defined frequency-hopping spectrum. In a further example, the long range subset of carriers is distributed throughout the defined frequency-hopping spectrum.

In one example, a short range subset of carriers within the defined frequency-hopping spectrum between the first communications device and the second communications device are allocated to a short range carrier class. At block 1004, a transmit power level is monitored between the first communications device and the second communications device. At block 1006, a high transmit power level condition is identified by determining whether the transmit power level exceeds a threshold value.

At block 1008, data is transmitted between the first communications device and the second communications device by frequency hopping between carriers only within the long range subset of carriers responsive to identifying the high transmit power level condition.

In one example, the process further includes identifying a transition from the high transmit power level condition to a low transmit power condition, and switching from frequency hopping between carriers only within the long range subset of carriers to frequency hopping between carriers only within the short range subset of carriers responsive to identifying the transition.

In one example, an activity level within the long range subset of carriers is monitored. The size of the long range subset of carriers is dynamically adjusted responsive to the activity level within the long range subset of carriers. The activity level may be the number of long-range users.

The Bluetooth standard allows multiple slaves to communicate to the same master in a piconet configuration. For example, base device 2 in FIG. 3 may communicate as a master towards wireless headset client device 4, the headset acting as a first slave; but it may also communicate as a master towards a dongle in a laptop (not shown), the dongle acting as a second slave. The dongle may be quite close to base device 2, therefore not needing a high transmit power level. In this situation, base device 2 may use carriers from the long-range subset of carriers when communicating with distant wireless headset client device 4 and may use carriers from the short-range subset of carriers when communicating with the nearby dongle.

While the exemplary embodiments of the present invention are described and illustrated herein, it will be appreciated that they are merely illustrative and that modifications can be made to these embodiments without departing from the spirit and scope of the invention. For example, although embodiments for Bluetooth (including Bluetooth Classic and Bluetooth Low Energy) are provided, the described methods apply to other similar packet-based, frequency hopping radio systems. Acts described herein may be computer readable and executable instructions that can be implemented by one or more processors and stored on a computer readable memory or articles. The computer readable and executable instructions may include, for example, application programs, program modules, routines and subroutines, a thread of execution, and the like. In some instances, not all acts may be required to be implemented in a methodology described herein.

Terms such as "component", "module", "circuit", and "system" are intended to encompass software, hardware, or a combination of software and hardware. For example, a system or component may be a process, a process executing on a processor, or a processor. Furthermore, a functionality, component or system may be localized on a single device or distributed across several devices. The described subject matter may be implemented as an apparatus, a method, or article of manufacture using standard programming or engineering techniques to produce software, firmware, hardware, or any combination thereof to control one or more computing devices.

Thus, the scope of the invention is intended to be defined only in terms of the following claims as may be amended, with each claim being expressly incorporated into this Description of Specific Embodiments as an embodiment of the invention.

What is claimed is:

1. A method of carrier selection for wireless communications between a first communications device and a second communications device in a frequency hopping communications system comprising:
   allocating to a long range carrier class a long range subset of carriers within a defined frequency-hopping spectrum between the first communications device and the second communications device;
   monitoring a transmit power level between the first communications device and the second communications device;
   identifying a high transmit power level condition comprising determining whether the transmit power level exceeds a threshold value; and
   transmitting data between the first communications device and the second communications device comprising frequency hopping between carriers only within the long range subset of carriers responsive to identifying the high transmit power level condition.

2. The method of claim 1, further comprising:
   identifying a transition from the high transmit power level condition to a low transmit power condition; and
   switching from frequency hopping between carriers only within the long range subset of carriers to frequency hopping between carriers only within the short range subset of carriers responsive to identifying the transition.

3. The method of claim 1, wherein the first communications device comprises a Bluetooth base device and the second communications device comprises a user wearable Bluetooth mobile device.

4. The method of claim 1, wherein the first communications device comprises a user wearable Bluetooth mobile device and the second communications device comprises a Bluetooth base device.

5. The method of claim 1, wherein the long range subset of carriers are distributed within two or more sub-bands of the defined frequency-hopping spectrum, wherein each sub-band of the two or more sub-bands comprise two or more adjacent carriers, and wherein each sub-band is separated from any other sub-band by two or more carriers.

6. The method of claim 5, wherein the two or more sub-bands comprise a first sub-band located in a lower one-third of the defined frequency-hopping spectrum, a second sub-band located in a middle one-third of the defined frequency-hopping spectrum, and a third sub-band located in a higher one-third of the defined frequency-hopping spectrum.

7. The method of claim 1, wherein the long range subset of carriers are distributed throughout the defined frequency-hopping spectrum.

8. The method of claim 1, further comprising monitoring an activity level within the long range subset of carriers.

9. The method of claim 8, further comprising dynamically adjusting a size of the long range subset of carriers responsive to the activity level within the long range subset of carriers.

10. The method of claim 8, wherein the activity level within the long range subset of carriers comprises a number of long-range users.

11. The method of claim 8, wherein the activity level within the long range subset of carriers comprises a wireless traffic a number of long-range users are creating on the long-range subset of carriers.

12. The method of claim 1, wherein upon identifying the high transmit power level condition, the first communications device or the second communications device contacts a third device which allocates the long range subset of carriers within the defined frequency-hopping spectrum between the first communications device and the second communications device.

13. A communications device for wireless communications comprising:
   a processor;
   a wireless transceiver configured for wireless communications utilizing a defined frequency-hopping spectrum;
   an antenna; and
   a memory storing a carrier selection optimization application program configured to:
      allocate to a long range carrier class a long range subset of carriers within the defined frequency-hopping spectrum between the communications device and a second communications device;
      monitor a transmit power level between the communications device and the second communications device;
      identify a high transmit power level condition comprising determining whether the transmit power level exceeds a threshold value; and
      transmit utilizing the wireless transceiver a data between the communications device and the second communications device comprising frequency hopping between carriers only within the long range subset of carriers responsive to identifying the high transmit power level condition.

14. The communications device of claim 13, wherein the communications device comprises a Bluetooth base device or a user wearable Bluetooth mobile device.

15. The communications device of claim 13, wherein the long range subset of carriers are distributed within two or more sub-bands of the defined frequency-hopping spectrum, wherein each sub-band of the two or more sub-bands comprise two or more adjacent carriers, and wherein each sub-band is separated from any other sub-band by two or more carriers.

16. The communications device of claim 13, wherein the carrier selection optimization application program is further configured to monitor an activity level within the long range subset of carriers.

17. The communications device of claim 16, wherein the carrier selection optimization application program is further configured to dynamically adjust a size of the long range subset of carriers responsive to the activity level within the long range subset of carriers.

18. A system comprising:
a central controller device comprising:
  a central controller processor;
  a central controller wireless transceiver;
  a central controller antenna;
  a central controller memory storing a frequency hopping spectrum management application program configured to:
    allocate to a long range carrier class a long range subset of carriers within a defined frequency-hopping spectrum;
    monitor an activity level within the long range subset of carriers; and
    dynamically adjust a size of the long range subset of carriers responsive to the activity level within the long range subset of carriers;
a first communications device comprising:
  a first communications device processor;
  a first communications device wireless transceiver configured for wireless communications with the central controller device and a second communications device;
  a first communications device antenna; and
  a first communications device memory storing a carrier selection optimization application program configured to:
    receive from the central controller device an identification of the long range subset of carriers;
    monitor a transmit power level between the first communications device and the second communications device;
    identify a high transmit power level condition comprising determining whether the transmit power level exceeds a threshold value; and
    transmit a data between the first communications device and the second communications device comprising frequency hopping between carriers only within the long range subset of carriers responsive to identifying the high transmit power level condition.

19. The system of claim 18, wherein the activity level within the long range subset of carriers comprises a number of long-range users.

20. The system of claim 18, wherein the carrier selection optimization application program at the first communications device transmits to the central controller device a notification indicating that the first communications device is frequency hopping between carriers only within the long range subset of carriers, and wherein the frequency hopping spectrum management application program at the central controller device utilizes the notification to monitor the activity level within the long range subset of carriers.

21. The system of claim 18, wherein the long range subset of carriers are distributed within two or more sub-bands of the defined frequency-hopping spectrum, wherein each sub-band of the two or more sub-bands comprise two or more adjacent carriers, and wherein each sub-band is separated from any other sub-band by two or more carriers.

* * * * *